(12) United States Patent
Ho et al.

(10) Patent No.: US 11,809,241 B2
(45) Date of Patent: Nov. 7, 2023

(54) DISPLAY DEVICE AND ELECTRONIC SYSTEM INCLUDING THE SAME

(71) Applicant: GIGA-BYTE TECHNOLOGY CO., LTD., New Taipei (TW)

(72) Inventors: Jui-Fong Ho, New Taipei (TW); Chung Hsin Wu, New Taipei (TW); Shen-Tsai Cheng, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 6 days.

(21) Appl. No.: 17/870,766

(22) Filed: Jul. 21, 2022

(65) Prior Publication Data

US 2023/0064928 A1 Mar. 2, 2023

(30) Foreign Application Priority Data

Aug. 31, 2021 (TW) ................................ 110132178

(51) Int. Cl.
*G06F 1/16* (2006.01)
*H04M 1/02* (2006.01)

(52) U.S. Cl.
CPC ........ *G06F 1/1686* (2013.01); *H04M 1/0264* (2013.01)

(58) Field of Classification Search
CPC .... G06F 1/1686; G06F 1/1637; G06F 1/1605; G06F 1/1601; G06F 1/1684; H04M 1/0264
See application file for complete search history.

(56) References Cited

U.S. PATENT DOCUMENTS

| 10,306,033 | B1 * | 5/2019 | Cheng | H04N 7/142 |
| 10,637,974 | B2 * | 4/2020 | Zeng | G06F 1/1624 |
| 11,044,391 | B2 * | 6/2021 | Lin | H04N 23/57 |
| 11,140,249 | B2 * | 10/2021 | Chen | H04M 1/0264 |
| 11,284,009 | B2 * | 3/2022 | Zou | G06F 1/1686 |
| 11,324,132 | B2 * | 5/2022 | Wang | H04M 1/026 |
| 2012/0236195 | A1 * | 9/2012 | Chang | H04N 23/51 |
| | | | | 348/E5.026 |
| 2020/0344338 | A1 * | 10/2020 | Yang | H04M 1/0254 |

(Continued)

FOREIGN PATENT DOCUMENTS

| CN | 109274884 A | * | 1/2019 |
| CN | 112203001 A | * | 1/2021 |
| TW | M594172 U | | 4/2020 |

OTHER PUBLICATIONS

Taiwan Office Action issued in corresponding application No. 110132178, dated Oct. 31, 2022.

*Primary Examiner* — Nidhi Thaker
(74) *Attorney, Agent, or Firm* — Maschoff Brennan

(57) ABSTRACT

A display device includes a casing, a display panel, and a camera module. The casing includes a bottom plate portion and a plurality of side plate portions, the plurality of side plate portions are respectively located at different sides of the bottom plate portion, and the of side plate portions and the bottom plate portion together define an accommodation space therebetween. The display panel is located in the accommodation space. One of the plurality of side plate portions has an inner side wall and a recess located at the inner side wall, the recess has an opening connected to the accommodation space and faces towards the display panel, and the camera module is accommodated in the recess.

16 Claims, 6 Drawing Sheets

(56) References Cited

U.S. PATENT DOCUMENTS

2021/0058499 A1* 2/2021 Li .................. H04M 1/0264
2021/0243519 A1* 8/2021 Kim ................ H04M 1/035
2022/0006934 A1* 1/2022 Tan ................. H04M 1/0264

* cited by examiner

DISPLAY DEVICE AND ELECTRONIC SYSTEM INCLUDING THE SAME

CROSS-REFERENCE TO RELATED APPLICATIONS

This non-provisional application claims priority under 35 U.S.C. § 119(a) on Patent Application No(s). 110132178 filed in R.O.C. (Taiwan) on Aug. 31, 2021, the entire contents of which are hereby incorporated by reference.

TECHNICAL FIELD

The disclosure relates to a display device, more particularly to a display device with narrow bezel and an electronic system including the display device.

BACKGROUND

Electronic products such as smartphones, notebook computers, tablet computers, and flat-screen TVs all have a display screen served as an output device for presenting visual information. With the change of living and working styles, some of the electronic products feature sound and image capturing functions, such as camera and microphone, to meet various needs such as video conference, remote teaching, and interactive games.

In a conventional display screen with camera, the camera and its display panel are both clamped between a front and rear bezels, but which is not favorable for achieving the growing trend for narrow border display design. For example, please see a conventional display 90 of a notebook computer 9 shown in FIG. 1, in the display 90, a front bezel 91 and a back cover 92 enclose a display panel 93 and a camera module 94 therebetween, in such an arrangement, the borders of the front bezel 91 not only need to overlap with display panel 93 but also need to provide an area large enough for the fixation with the back cover 92, and the top border of the front bezel 91 must be wide enough to cover the camera module 94, these limitations lead to a wide borders of the front bezel 91.

Some other displays rearrange the camera module to the side closer to the other casing that has keyboards, but which results in an unwelcome angle of view.

SUMMARY

Accordingly, one aspect of the disclosure is to provide a display device and electronic system including the same capable of solving the aforementioned problems.

One embodiment of the disclosure provides a display device including a casing, a display panel, and a camera module. The casing includes a bottom plate portion and a plurality of side plate portions, the plurality of side plate portions are respectively located at different sides of the bottom plate portion, and the of side plate portions and the bottom plate portion together define an accommodation space therebetween. The display panel is located in the accommodation space. One of the plurality of side plate portions has an inner side wall and a recess located at the inner side wall, the recess has an opening connected to the accommodation space and faces towards the display panel, and the camera module is accommodated in the recess.

Another embodiment of the disclosure provides an electronic system including the aforementioned display device.

According to the display device and electronic system including the same as discussed in the above embodiments of the disclosure, the casing of the display device has a recess on the inner side wall of one of its side plate portions and the recess faces the display panel of the accommodation space of the casing and is able to accommodate the camera module, thus the display device of the disclosure has no need to use any additional front bezel for the installation of the camera module. In the case that the display device of the disclosure is served as a notebook computer screen, the absence of front bezel makes the display device a less bezel display with a thin frame around its display panel.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
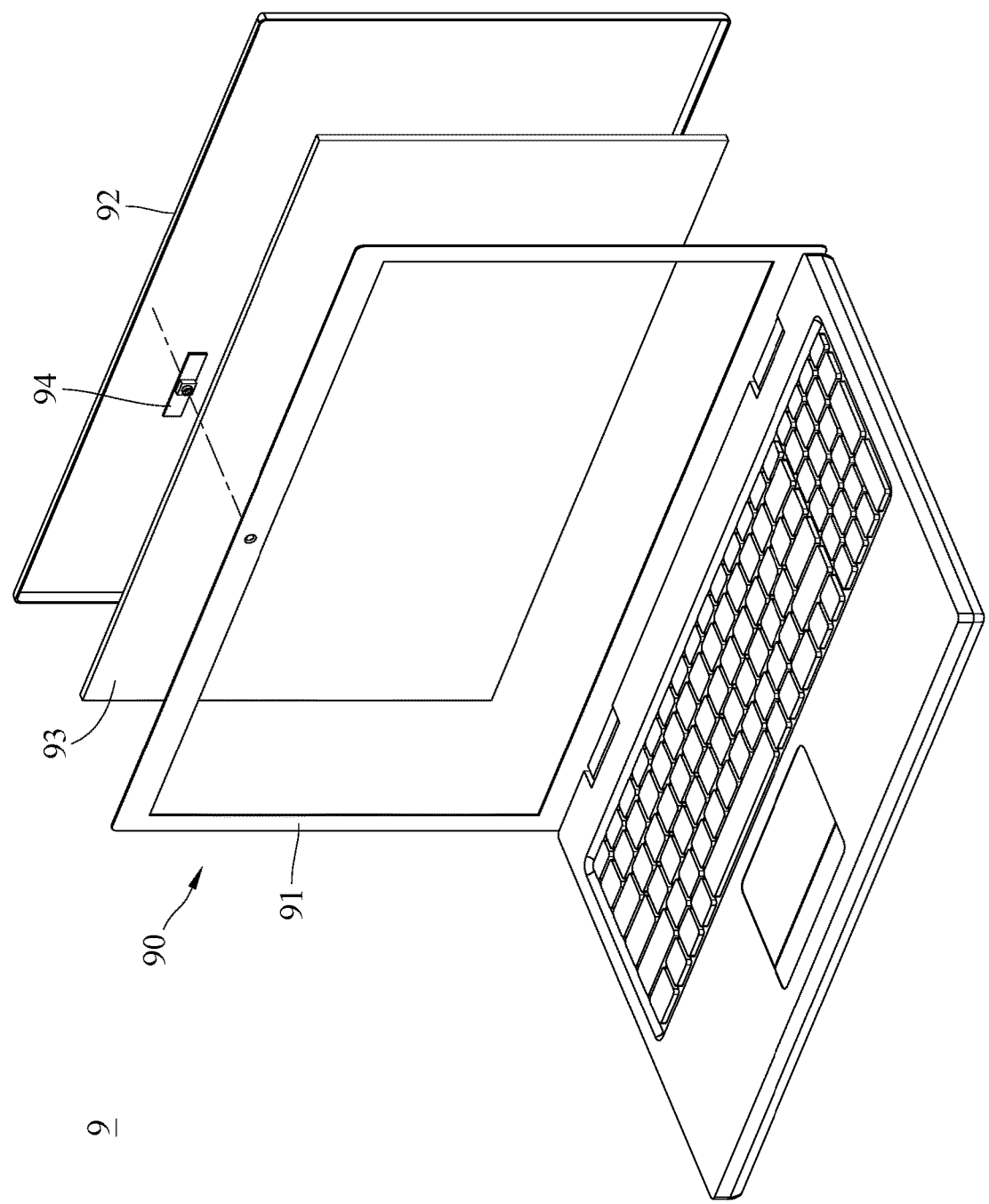
FIG. 1 is a partial exploded view of a conventional laptop computer.
Figure 2:
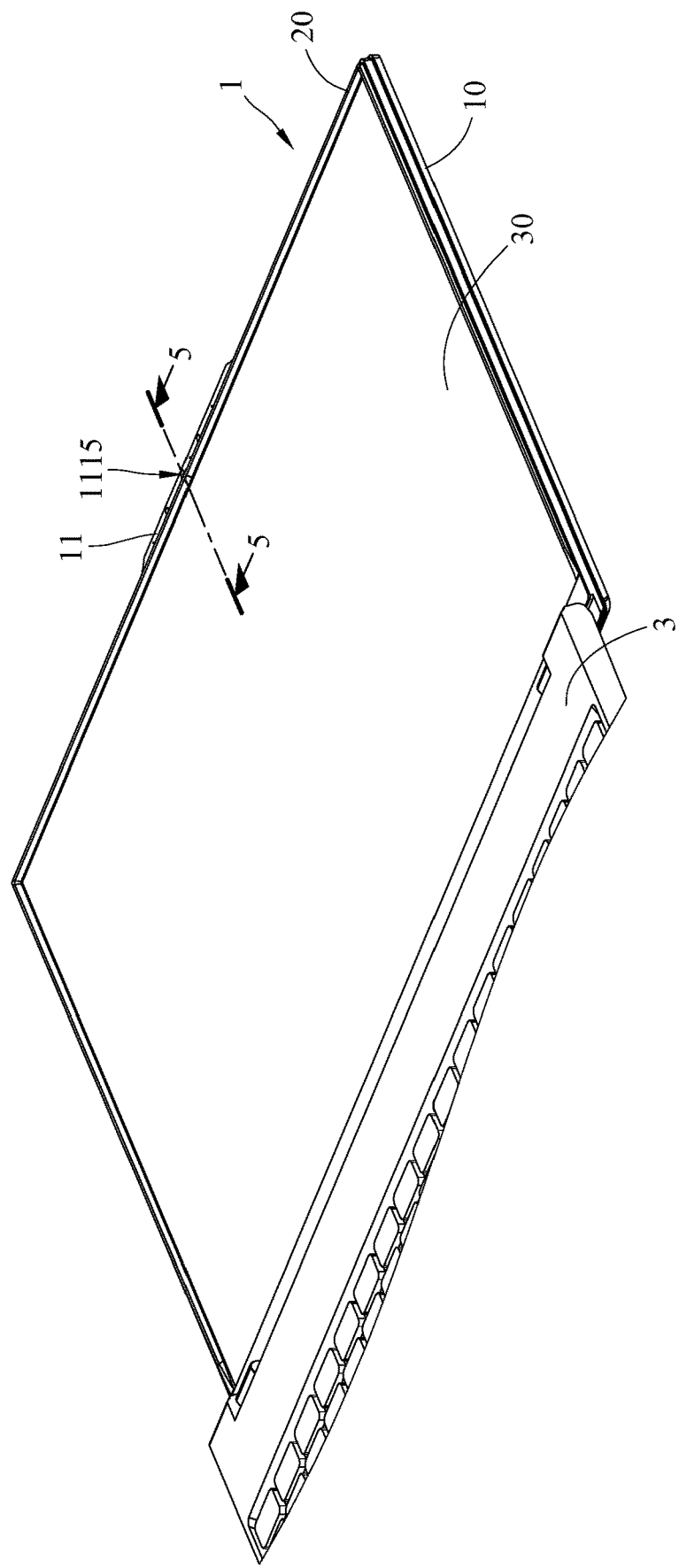
FIG. 2 is a partial perspective view of an electronic system according to one embodiment of the disclosure.
Figure 3:
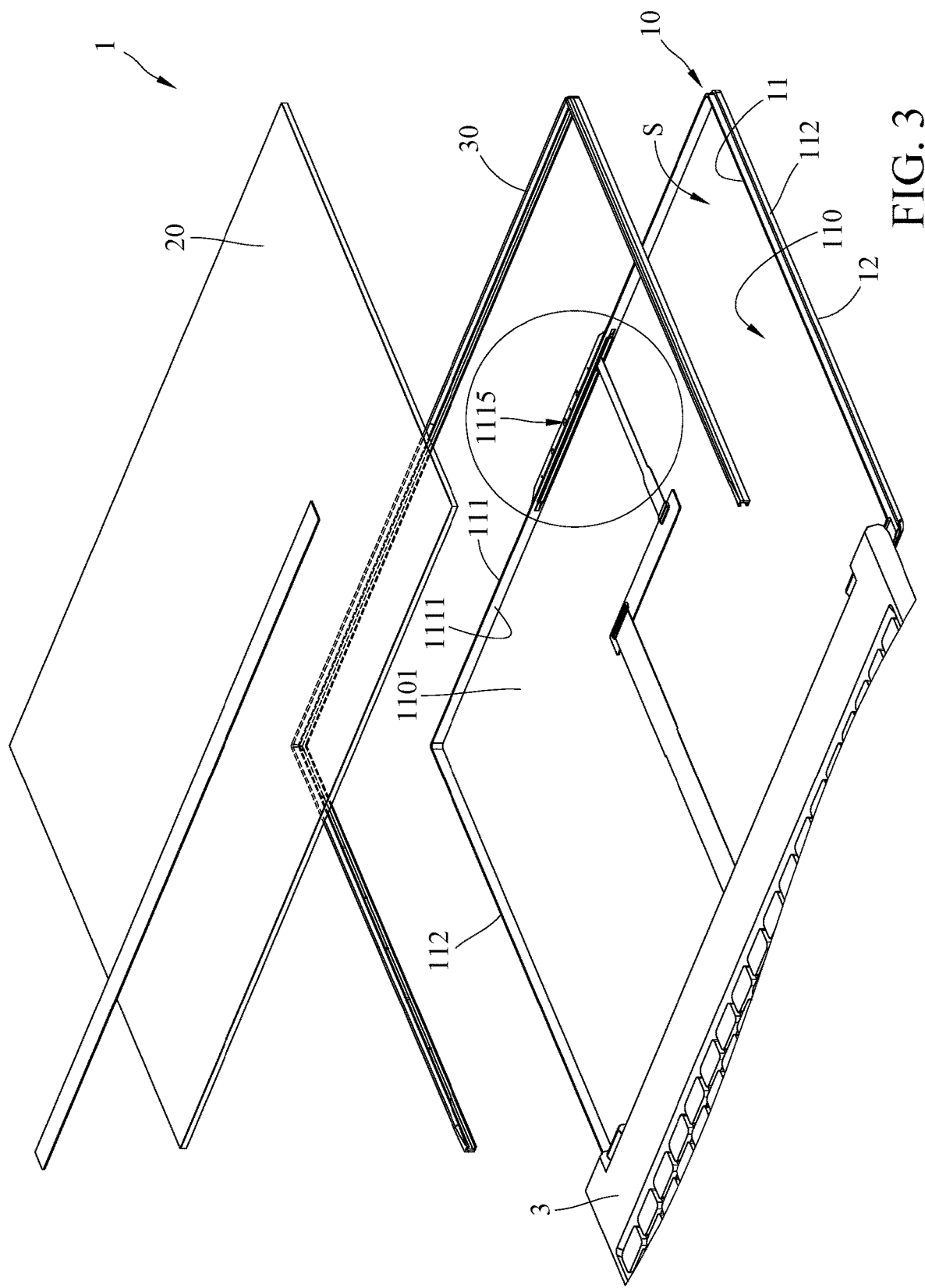
FIG. 3 is an exploded view of a display device in FIG. 2.
Figure 4:
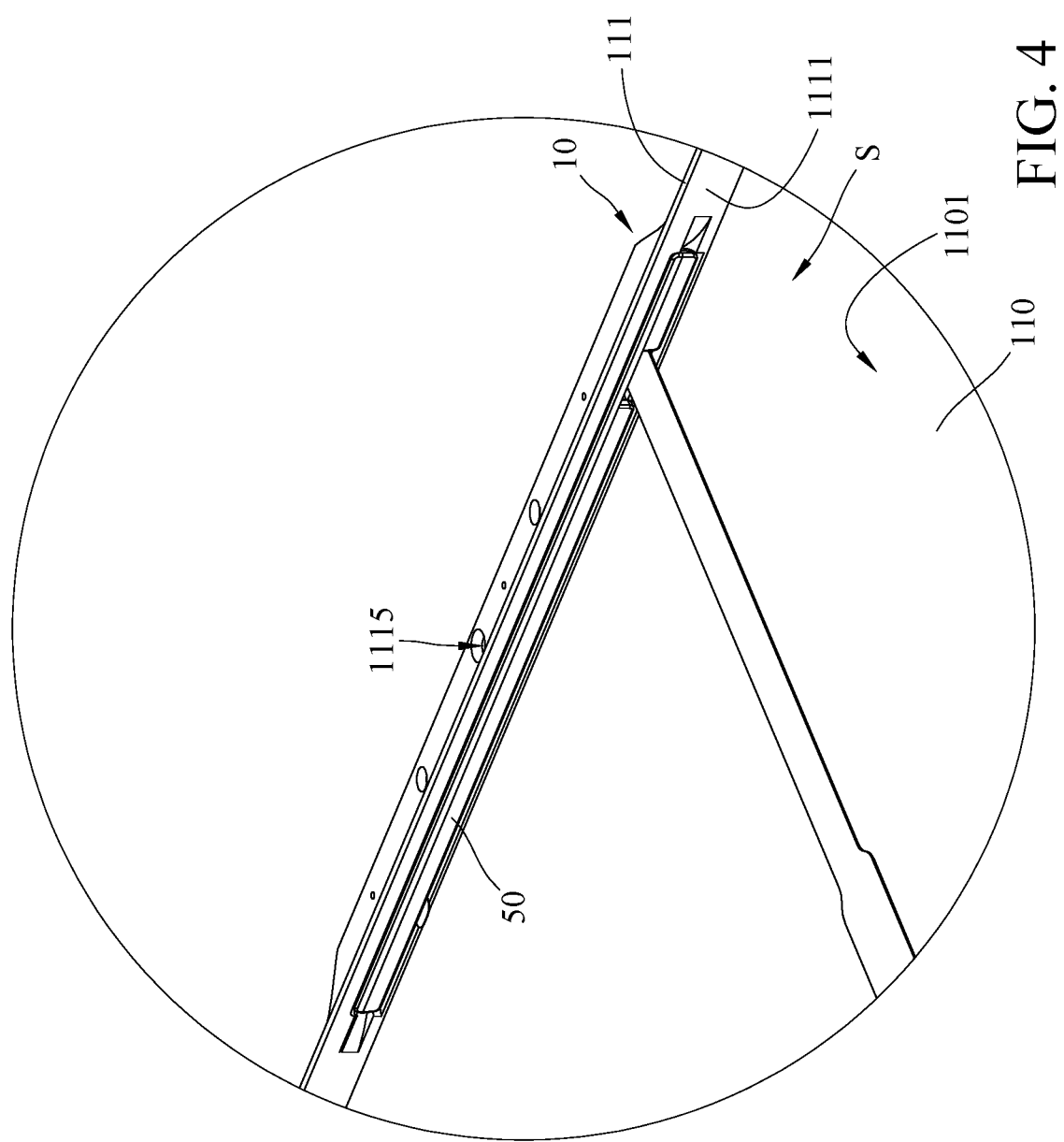
FIG. 4 is a partial enlarged view of the display device in FIG. 3.
Figure 5:
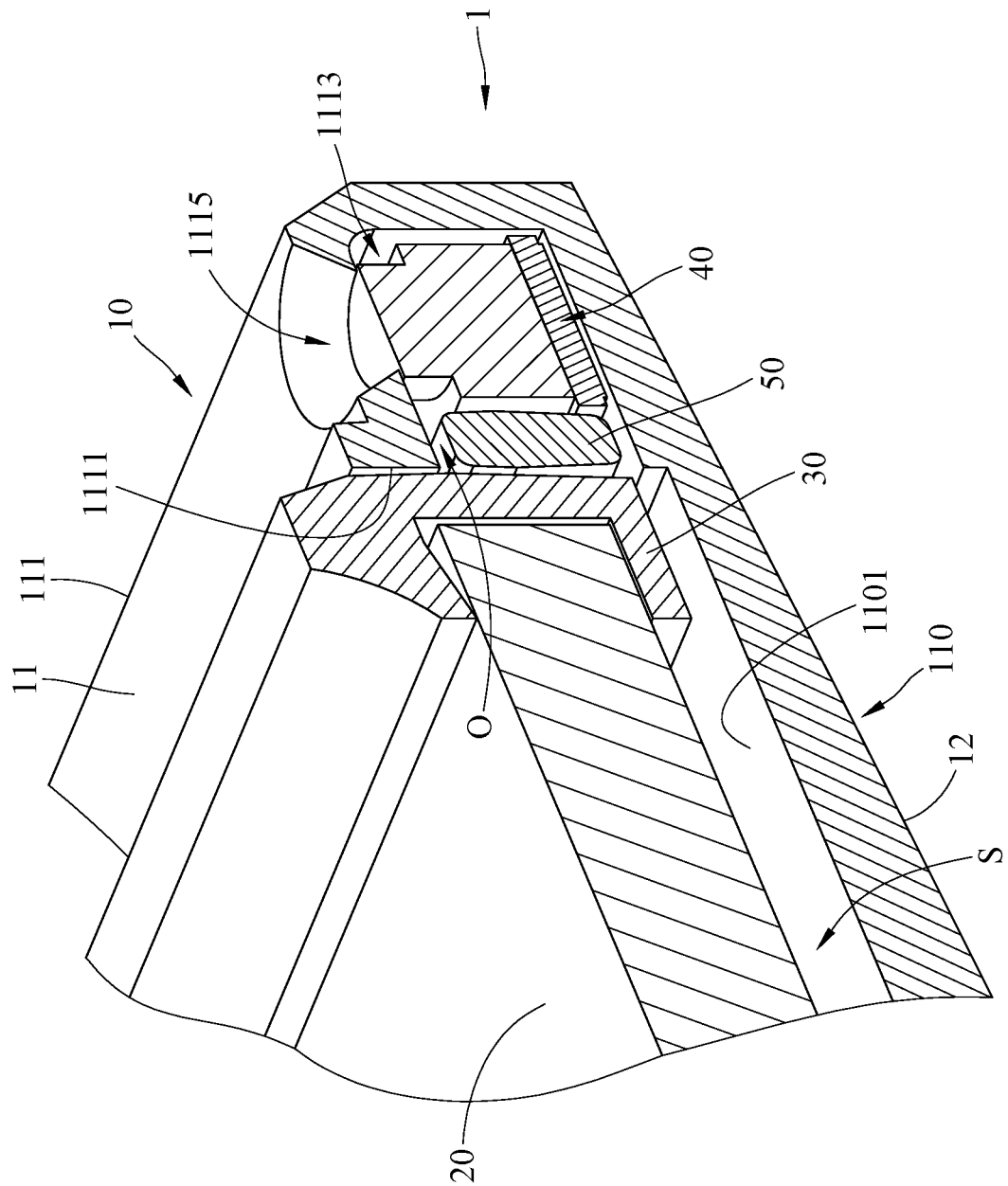
FIG. 5 is a partial enlarged cross-sectional view of the display device taken along line 5-5 in FIG. 2.
Figure 6:
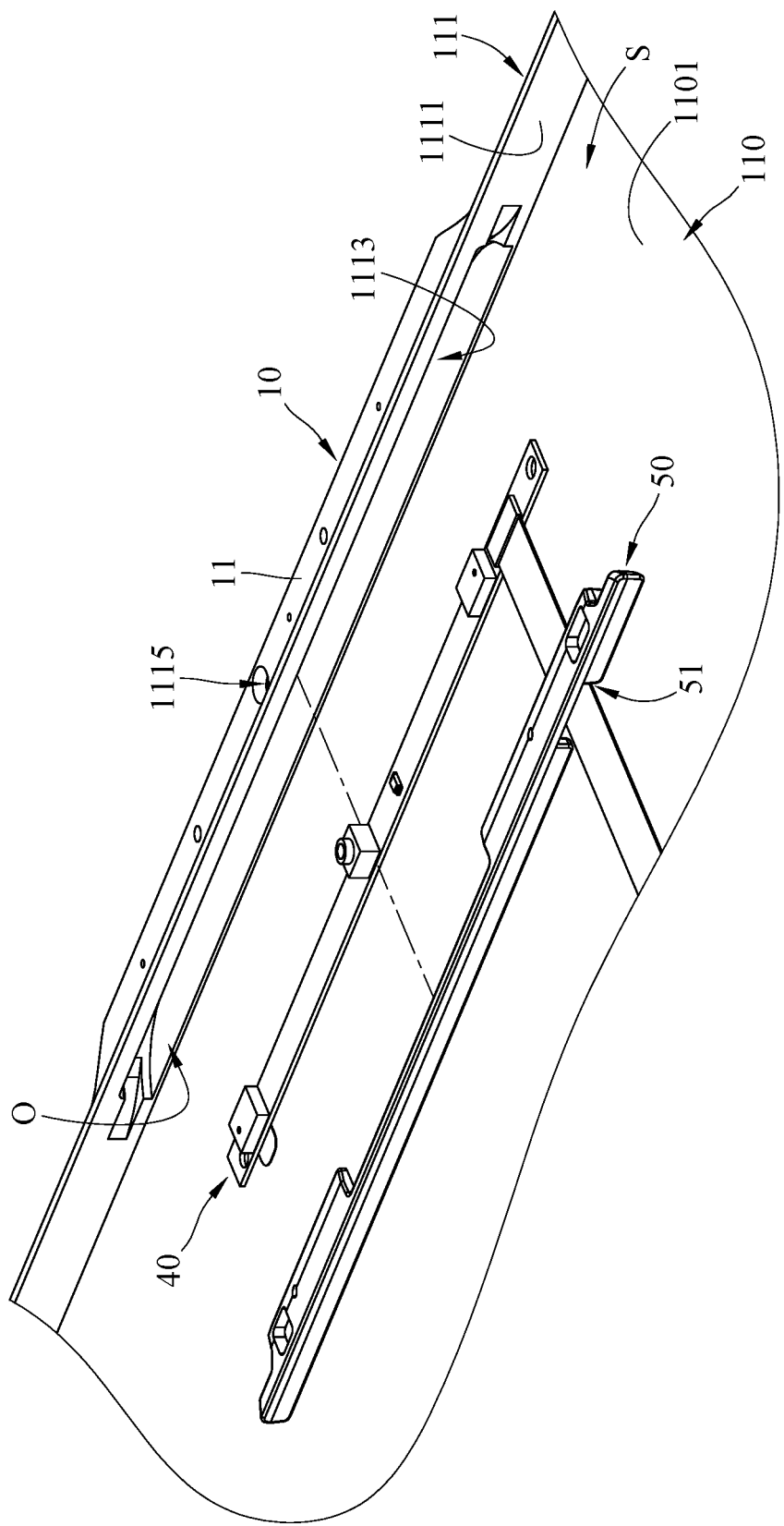
FIG. 6 is an exploded view of the display device in FIG. 4.

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," "installed," "provided," and variations thereof are used broadly and encompass both direct and indirect mountings, connections, installations, and fixations. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

One embodiment of the disclosure is provided with reference to FIGS. 2-6. It is noted that the details in FIGS. 2-6 are exemplary but not limiting.

As shown, one embodiment of the disclosure provides an electronic system 2 including a display device 1, the display device 1 may be served as an electronic product or part thereof which is able to display image, such as a smartphone, notebook computer, tablet computer, or a television. In this embodiment, the electronic system 2 may be in a form of notebook computer, and in this exemplary application, the display device 1 is employed as a screen pivotably connected to a base part 3, where the base part 3 means the part other than the screen of the notebook computer.

In this embodiment, the display device 1 may include a casing 10 and a display panel 20. The casing 10 means an outermost part of the display device 1 and may be used to accommodate or support the display panel 20 and other associated components. In this embodiment, the casing 10 may be served as a back cover for screen. The casing 10 may be an integrally formed single piece made of any suitable metal or other suitable materials. The display panel 20 may be any typical display panel for display.

The casing 10 has a first outer surface 11 and a second outer surface 12, the first outer surface 11 means the part of the outer surface of the casing 10 that faces towards the viewers watching the display panel 20; in other words, the first outer surface 11 means the part of the outer surface of the casing 10 that faces towards the base part 3 when the display panel 20 is folded down on the base part 3. The second outer surface 12 means the part of the outer surface of the casing 10 that is located opposite to the first outer surface 11; in other words, the second outer surface 12 means the part of the outer surface of the casing 10 that is located opposite to the base part 3 when the display panel 20 is folded down on the base part 3.

In this embodiment, the casing 10 may include a bottom plate portion 110 and a plurality of side plate portions (e.g., a side plate portion 111 and two side plate portions 112). The side plate portions 111 and 112 are respectively located at different sides of the bottom plate portion 110. The side plate portions 111 and 112 and the bottom plate portion 110 together define an accommodation space S therebetween. The accommodation space S may be considered as a recessed space from the first outer surface 11 of the casing 10. The accommodation space S is configured to accommodate the display panel 20. The bottom plate portion 110 has a supporting surface 1101 located at the bottom of the accommodation space S. As shown, there is a step between the supporting surface 1101 and the first outer surface 11 of the casing 10. The side plate portions 111 and 112 may each have an inner side wall defining side of the accommodation space S. In one embodiment, the side plate portion 111 may have an inner side wall 1111, the inner side wall 1111 may be an inner surface of the casing 10 that is connected to the supporting surface 1101 and is at an angle to the supporting surface 1101. As shown, the inner side wall 1111 may be considered as the step between the supporting surface 1101 and the first outer surface 11. A side of the accommodation space S is opened for the placement of the display panel 20 into the accommodation space S. When the display panel 20 is in the accommodation space S, the supporting surface 1101 faces the rear side of the display panel 20.

Optionally, the display device 1 may further include a frame part 30 to make the display panel 20 stably and firmly fixed in the accommodation space S. In this embodiment, the frame part 30 may be made of any suitable material with required flexibility, deformability, or compressibility, such as rubber or silicone, and can be manufactured by injection molding, thus its material and manufacturing costs are low. The cross-section of the frame part 30 may have C like shape. Thus, the frame part 30 is able to clamp edges of the display panel 20. In more detail, the frame part 30 may clamp edges of one or more sides of the display panel 20. As such, when the frame part 30 and the display panel 20 are accommodated in the accommodation space S, the frame part 30 clamps the edges of the display panel 20, at least part of the frame part 30 is clamped by the display panel 20 and the inner side wall 1111 of the side plate portion 111 of the casing 10, thus the frame part 30 is able to secure the position of the display panel 20 in the accommodation space S.

In addition, in this embodiment, the side plate portion 111 has a recess 1113 recessed from its inner side wall 1111. The recess 113 is configured to accommodate a camera module 40. The camera module 40 may be any typical camera module suitable for smartphone, notebook computer, or tablet computer. The recess 1113 is recessed from the inner side wall 1111 of the side plate portion 111 towards away from the display panel 20. The recess 1113 may be shaped and sized to be able to accommodate the camera module 40. The recess 1113 has an opening O facing towards the display panel 20 and is connected to the accommodation space S. The opening O is for the placement of the camera module 40 into the recess 1113. Thus, when the frame part 30 and the display panel 20 are placed into the accommodation space S, the frame part 30 and the display panel 20 are able to cover the opening O of the recess 1113 so as to secure the position of the camera module 40 in the recess 1113.

It is noted that the opening O is the only pathway for the placement and removal of the camera module 40. In this embodiment, the recess 1113 is directly connected to the inner side wall 1111 and spaced apart from the surfaces of the casing 10 (e.g., the first outer surface 11 and the second outer surface 12) other than the inner side wall 1111. In this case, the camera module 40 is only placeable into the recess 1113 from the opening O along a direction substantially parallel to the supporting surface 1101 of the bottom plate portion 110; in other words, the camera module 40 is placeable into the recess 1113 along the supporting surface 1101 of the bottom plate portion 110.

Optionally, the display device 1 may further include a positioning component 50 to firmly fix the display panel 20 into the accommodation space S. In this embodiment, the positioning component 50 may be made of any suitable material, such as plastic or rubber. At least part of the positioning component 50 has a contour mating at least part of the camera module 40. Thus, the positioning component 50 can be used to fill the gap between the camera module 40 and the frame part 30, and the force that the frame part 30 acts on the positioning component 50 can be applied to the camera module 40, preventing gap from occurring to cause unwanted movement of the camera module 40. As such, with the positioning and push of the positioning component 50, the position of the camera module 40 in the recess 1113 is secured. It is noted that the display device in other embodiments may omit the positioning component 50 when the camera module 40 can be firmly held in the recess 1113 by itself.

Further, in this embodiment, the positioning component 50 may have a cable hole 51 being an elongated through hole connected to the recess 1113 and the accommodation space S, thus a suitable cable (not numbered) electrically connected to the camera module 40 and associated components located outside the recess 1113 can be disposed through the cable hole 51.

Moreover, in this embodiment, the side plate portion 111 of the casing 10 has a camera hole 1115 formed on the first outer surface 11, the camera hole 1115 is connected to the recess 1113 and corresponds to the camera module 40. In specific, the camera hole 1115 is a through hole exposing the camera module 40 in the recess 1113, such that the lens (not numbered) of the camera module 40 can be exposed to the outside via the camera hole 1115.

Accordingly, in the display device 1, the recess 1113 on the inner side wall 1111 of the casing 10 provides a space extending away from the display panel 20 and having an opening O facing the display panel 20 for receiving the camera module 40, such that the camera module 40 can be clamped by the display panel 20 and the side plate portion 1111 of the casing 10 when in the recess 1113. Compared to the conventional display of notebook computer whose camera module needs additional front bezel (e.g., the front bezel 91 in FIG. 1) for fixation, the borders of the display device 1 of the disclosure are narrower.

Also, in the display device 1, the display panel 20 is firmly fixed in the casing 10 by being clamped and pushed by the frame part 30, realizing a boltless assembly and facilitating the removal and installation of the display panel 20.

In the conventional display of notebook computer whose display panel and camera module are installed by being clamped by a front bezel and a back cover, assembling the front bezel and the display panel requires bolts and therefore leads to a troublesome works; in contrast, the display device 1 of the disclosure achieve a no-bolt installation of the display panel 20 and therefore is beneficial for improving efficiency in the associated works. In addition, in the conventional display of notebook computer, the top border of the front bezel is width since it needs to cover the camera module and provides a surface large enough for the fixation with the back cover; in contrast, the display device 1 of the disclosure uses the frame part 30 to hold the display panel 20 without the need of any front bezel, making the display device 1 a less bezel display with a thin frame around the display panel 20. Further, the material and manufacturing of the frame part 30 cost less than the front bezel used in the conventional display, thus the overall cost of the display device 1 of the disclosure is lower.

The display device in the previous embodiment is exemplary but not limiting. The display device of the disclosure may be modified as required as long as the camera module is installed in a recess formed on the inner surface of the casing without using any front bezel. For example, in an embodiment that the display device omits the positioning component, the recess may be shaped and sized to be mating part of the contour of the camera module so that the recess is able to position the camera module.

It is noted that the display device of the disclosure is not limited to be served the screen of a notebook computer. For example, in other embodiments, the display device may be employed as a screen of a desktop computer, in this application, the base part connected to the display device may be any typical display stand; in another embodiment, the display device may be employed as a flat-screen TV, and the base part connected to the display device may be any typical display stand or wall mount. It is also noted that the base part is optional; in one embodiment of the disclosure, the display device may be applied to a smartphone or a tablet computer, in these case, the display device integrate all the components required by an electronic system; in other words, the display device is a complete electronic system.

According to the display device and electronic system including the same as discussed in the above embodiments of the disclosure, the casing of the display device has a recess on the inner side wall of one of its side plate portions and the recess faces the display panel of the accommodation space of the casing and is able to accommodate the camera module, thus the display device of the disclosure has no need to use any additional front bezel for the installation of the camera module. In the case that the display device of the disclosure is served as a notebook computer screen, the absence of front bezel makes the display device a less bezel display with a thin frame around its display panel.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A display device comprising: a casing comprising a bottom plate portion and a plurality of side plate portions, wherein the plurality of side plate portions are respectively located at different sides of the bottom plate portion, and the plurality of side plate portions and the bottom plate portion together define an accommodation space therebetween; a display panel located in the accommodation space; and a camera module; wherein one of the plurality of side plate portions has an inner side wall and a recess located at the inner side wall, the recess has an opening connected to the accommodation space and faces towards the display panel, and the camera module is accommodated in the recess, wherein the display device further comprising a frame part clamping edges of the display panel and partially clamped by the display panel and the camera module.

2. The display device according to claim 1, wherein the casing has a first outer surface and a second outer surface located opposite to each other, the recess is spaced apart from both the first outer surface and the second outer surface.

3. The display device according to claim 1, wherein the casing is an integrally formed single piece, a first outer surface of the casing has a camera hole which is connected to the recess and exposes the camera module.

4. The display device according to claim 1, wherein the frame part covers the opening of the recess.

5. The display device according to claim 1, wherein the frame part is made of rubber or silicone.

6. The display device according to claim 1, further comprising a positioning component mating a contour of at least part of the camera module, wherein the positioning component and the camera module are accommodated in the recess.

7. The display device according to claim 6, wherein the positioning component has a cable hole being an elongated through hole connected to the recess and the accommodation space.

8. The display device according to claim 1, wherein the camera module is placeable into the recess along a direction substantially parallel to a supporting surface of the bottom plate portion.

9. An electronic system, comprising a display device, wherein the display device comprising: a casing comprising a bottom plate portion and a plurality of side plate portions, wherein the plurality of side plate portions are respectively located at different sides of the bottom plate portion, and the plurality of side plate portions and the bottom plate portion together define an accommodation space therebetween; a display panel located in the accommodation space; and a camera module; wherein one of the plurality of side plate portions has an inner side wall and a recess located at the inner side wall, the recess has an opening connected to the accommodation space and faces towards the display panel, and the camera module is accommodated in the recess, wherein the display device further comprises a frame part clamping edges of the display panel and is partially clamped by the display panel and the camera module.

10. The electronic system according to claim 9, wherein the casing has a first outer surface and a second outer surface located opposite to each other, the recess is spaced apart from both the first outer surface and the second outer surface.

11. The electronic system according to claim 9, wherein the casing is an integrally formed single piece, a first outer surface of the casing has a camera hole which is connected to the recess and exposes the camera module.

12. The electronic system according to claim 9, wherein the frame part covers the opening of the recess.

13. The electronic system according to claim 9, wherein the frame part is made of rubber or silicone.

14. The electronic system according to claim 9, wherein the display device further comprises a positioning component mating a contour of at least part of the camera module, the positioning component and the camera module are accommodated in the recess.

15. The electronic system according to claim 14, wherein the positioning component has a cable hole being an elongated through hole connected to the recess and the accommodation space.

16. The electronic system according to claim 9, wherein the camera module is placeable into the recess along a direction substantially parallel to a supporting surface of the bottom plate portion.

* * * * *